J. R. DUNHAM.
IMPLEMENT SCRAPER MECHANISM.
APPLICATION FILED AUG. 6, 1919.
1,367,736. Patented Feb. 8, 1921.
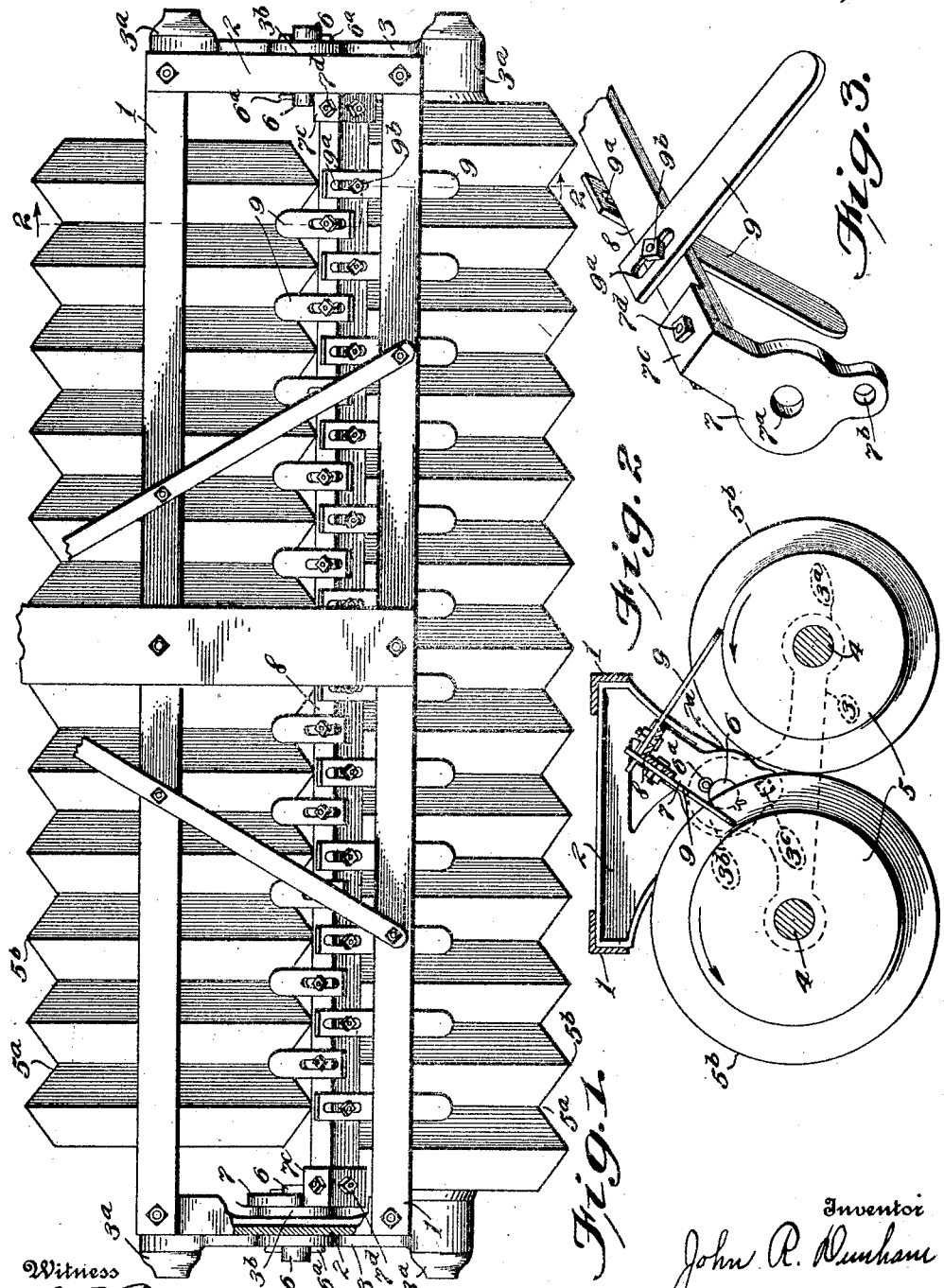

UNITED STATES PATENT OFFICE.

JOHN R. DUNHAM, OF BEREA, OHIO, ASSIGNOR TO THE DUNHAM COMPANY, OF BEREA, OHIO, A CORPORATION OF OHIO.

IMPLEMENT SCRAPER MECHANISM.

1,367,736.      Specification of Letters Patent.      Patented Feb. 8, 1921.

Application filed August 6, 1919. Serial No. 315,752.

*To all whom it may concern:*

Be it known that I, JOHN R. DUNHAM, a citizen of the United States, residing at Berea, in the county of Cuyahoga and State of Ohio, have invented certain new and useful Improvements in Implement Scraper Mechanism, of which the following is a specification.

My invention relates to improvements in implement scraper mechanism, the present embodiment of the invention being particularly designed and adapted for use in connection with that class or type of implements commonly known as "soil pulverizers" in which gangs of pulverizing or "packer" disks are employed, said disks having their outer or soil engaging portions oppositely curved and terminating in cutting edges and abutting against each other so that the curved portions of the adjacent disks conjointly form intervening soil packing ridge forming grooves. In view of the arrangement of the packer disks such disks when arranged in gangs are preferably arranged in staggered relation to each other so that the cutting edges of the packer disks of one gang will traverse the median portion of the ridges formed by the packing disks of the gang of disks in front.

The primary object of this invention is to provide a generally improvised scraper mechanism for implements of the character indicated, which will be exceedingly simple in construction, cheap of manufacture and efficient in use.

A further and very important object of the invention is the provision of an improved scraper bar arranged above and common to the packer disks of the front and rear gangs, together with improved means for attaching such scraper bar to the frame members carrying such gangs so that as the gangs oscillate in their active soil pulverizing operation the scraper bar together with the scraper blades carried thereby will be carried and maintained in a fixed relation to the respective soil packing ridge forming grooves of the packer disks.

A still further object of the invention is the provision of an improved scraper attachment which may be readily attached to or detached from standard soil pulverizing implements of the character indicated and having improved detachable and adjustably mounted scraper blades adapted to rest within and to clear the soil packing ridge forming grooves of the alternately arranged packer disks of the adjacent front and rear gangs.

With the above mentioned and other ends in view, my invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1, is a top plan view of a soil pulverizer of the two-gang packer disk type equipped with scraper mechanism constructed in accordance with this invention.

Fig. 2, a cross sectional view of the same taken on line 2—2 of Fig. 1.

Fig. 3, a fragmentary perspective view of one end of the scraper bar and one of its attaching members, detached.

Similar numerals of reference designate like parts throughout all the figures of the drawings.

In the present instance, the soil pulverizer comprises a main frame made up of transverse members 1, connected to depending brackets 2, terminating in bearing portions $2^a$, having bearing openings to receive a bearing member or pin and connected as hereinafter described.

As a means of flexibly connecting the main frame to the frame members carrying the front and rear gang packer disks, a subjacent rocker frame is provided, said rocker frame, in the present instance, comprising end rocker members 3, the latter terminating in socket bearing heads $3^a$, removably receiving and containing the ends of the bearing shafts 4, carrying the packer disks 5, forming the front and rear gangs.

It will be seen that the curved sides of the pulverizing or packer disks abut against each other forming the soil pulverizing ridge forming grooves $5^a$, and that the disks of the front and rear gangs are arranged in staggered relation to each other so that the cutting edges $5^b$, thereof, in the rear gang will traverse the centers of the ridges formed by the grooves of the disks of the front gang.

As a means of connecting the rockers 3, to the bearing portions $2^a$, of the brackets of the main frame, the intermediate portions of the rocker members are provided with upwardly extending bearing lugs 3ᵇ, extending on opposite sides of the bearing members 2ª, of the brackets and provided with bearing openings adapted to register with the openings in the brackets 2, and to removably receive and contain a bearing member or pin 6, the latter, in the present instance, being secured by means of cotter pins 6ª.

As a means of detachably mounting the scraper mechanism in proper relation to the concaved sides of the disks and in constant or fixed relation to the disks as the gangs oscillate, the bearing members 6, are preferably extended on their inner sides to receive and carry a pair of scraper bar supporting members or brackets 7, said brackets 7, being provided with bearing openings 7ª, adapted to pass over the bearing pins 6, and as a means of detachably securing the brackets 7, to the inner sides of the rockers 3, so as to rock or oscillate with the rockers 3, the brackets 7, are preferably provided with extensions having bolt receiving openings 7ᵇ, (see Fig. 3) suitable screw bolts 3ᶜ, being passed through such openings 7ᵇ, and threaded in suitable threaded openings formed on the inner sides of the rockers 3.

As a means of detachably securing and supporting the ends of the scraper bar 8, the upper ends of the brackets 7, are preferably provided with angular or channeled shaped attaching flanges 7ᶜ, to fit over the angular shaped scraper bar 8, and provided with attaching elements or bolts 7ᵈ.

It will be seen upon reference to Fig. 2, that the scraper carrying bar 8, is of substantially inverted V-shape in cross section and that the same is arranged in a vertical plane substantially coincident with the meeting peripheries of disks 5, the opposite face sides of the angular shaped bar being utilized for forming bearing or attaching surfaces for the oppositely arranged and extending scraper blades 9.

In view of the alternate or staggered relation of the soil packing ridge forming grooves 5ª, of the packer disks, the scraper blades 9, are spaced apart and alternately arranged so that the free ends of the scraper blades 9, will traverse the bottom portions of the grooves 5ª, at the joints or abutting portions of the disks 5, and thus effectually clear the latter of attaching earth and foreign substances.

As a means of detachably and adjustably connecting the scraper blades 9, so that the latter may be readily adjusted or removed or replaced, the scraper blades 9, are provided at their base portions with longitudinally extending slots 9ª, adapted to receive and contain a plurality of attaching elements 9ᵇ, in the present instance in the form of nuts and clamping bolts, as shown.

It will be seen that the angular shaped scraper carrying bar 8, forms a common supporting bar for the respective oppositely extending alternately arranged scrapers 9, of the disks forming the front and rear gangs and that the attachment of the scraper bar 8, is such as to maintain the latter together with the blades in a constant and uniform relation to the packer disks as the latter oscillate with the movements of the rocker frame members 3.

From the foregoing description, taken in connection with the accompanying drawings, the operation and advantages of my invention will be readily understood.

Having thus described one of the embodiments of my invention, what I claim and desire to secure by Letters Patent, is,—

1. A scraper for soil pulverizers, comprising scraper bar supporting members on the frames carrying the front and rear gangs of packer disks and arranged in fixed relation with the latter, and a scraper bar common to the packer disks of said front and rear gangs and provided with blades above the grooved portions of said disks.

2. In an implement provided with frame members carrying front and rear gangs of packer disks having alternately arranged grooved soil packer portions, a scraper bar carried by said rocker frame members above and common to the meeting peripheries of said disks of said gangs, and scraper bars extending from opposite sides of said scraper bar within the grooved soil packer portions of said disks.

3. In an implement provided with a main frame, and a rocker frame provided with front and rear gangs of packer disks arranged in staggered relation to each other, a scraper bar detachably carried by said rocker frame above said disk gangs, and alternately arranged oppositely extending scraper blades adjustably and detachably connected to said scraper bar and extending within the grooved portions of said disk gangs.

4. In an implement provided with a main frame, and a subjacent rocker frame carried thereby and provided with front and rear gangs of packer disks arranged in staggered relation to each other, a scraper bar carried by said rocker frame above said disk gangs, and alternately arranged oppositely extending scraper blades detachably connected to said scraper bar and extending within the grooved portions of said packer disks.

5. In a soil pulverizer, comprising a main frame, a subjacent rocker frame carried thereby, and gangs of packer disks carried by said rocker frame and arranged in staggered relation to each other forming alternately arranged soil packer grooves between the packer disks, a scraper bar carried by said rocker frame and adapted to oscillate with the latter, and scraper blades extending from opposite sides of said scraper bar within the packer grooves of said packer disks.

6. In a soil pulverizer, a frame provided with depending brackets having bearing openings, rocker frame members below said bearing brackets and provided with bearing lugs having openings registering with said bearing openings, bearing members extending through said openings of said brackets and lugs, bearing shafts carried in the ends of said rocker frame members and provided with packer disks forming front and rear gangs, bracket members on said rocker frame members and provided with openings mounted on said bearing members, means for securing said brackets to said rocker frame members whereby the same will rock with the latter, and a scraper bar detachably secured to said brackets and provided with scraper blades engaging the concaved sides of said packer disks.

7. In a soil pulverizer, a frame provided with end brackets having bearing openings, subjacent rocker frames provided with openings registering with said bearing openings, detachable bearing pins extending through said openings of said brackets and rocker frames, bearing shafts carried by said rocker frames and provided with packer disks forming front and rear gangs, upwardly and rearwardly extending bracket members at the inner sides of said rocker frame members and mounted on said detachable bearing pins, means for detachably securing said brackets to said rocker frames whereby the same will rock with the latter and said packer disks, and a scraper bar carried by said brackets and provided with scraper blades engaging the concaved sides of said front and rear gangs of packer disks.

In testimony whereof I have affixed my signature.

JOHN R. DUNHAM.